United States Patent Office 3,642,857
Patented Feb. 15, 1972

3,642,857
1,1,1-TRICHLORO-2-PROPYL 2,2,2-TRICHLORO-ETHYL CARBONATE
Jorge Pengman Li and John Hans Biel, Milwaukee, Wis., assignors to Aldrich Chemical Company, Inc., Milwaukee, Wis.
No Drawing. Filed Dec. 12, 1968, Ser. No. 783,441
Int. Cl. C07c 69/62, 69/64; A61k 27/00
U.S. Cl. 260—463                                          1 Claim

ABSTRACT OF THE DISCLOSURE 1,1,1 - trichloro - 2 - propyl 2,2,2 - trichloroethyl carbonate exhibits sedative activity and is useful as a sedative in mammals.

BACKGROUND OF THE INVENTION

(1) Field of the invention

This invention relates to a novel compound which exhibits sedative activity and is useful as a sedative agent in mammals.

(2) Description of the prior art

An object of the present invention is to provide a novel compound which would be of value as a sedative agent, producing prolonged sedation in mammals without the side effect of gastrointestinal irritation.

SUMMARY OF THE INVENTION

There is provided according to the present invention 1,1,1 - trichloro - 2 - propyl 2,2,2 - trichloroethyl carbonate which has the formula

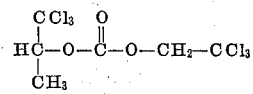

DETAILED DESCRIPTION

The compound of the present invention 1,1,1-trichloro-2 - propyl 2,2,2-trichloroethyl carbonate is unique in its ability to produce prolonged (8 hours) sedation in mammals without the side effect of gastrointestinal irritation and, therefore, differs both qualitatively and quantitatively from chloral hydrate, a standard sedative agent of short duration which causes emesis in a high percentage of the test animals (dogs). Surprisingly, a close structural analog, bis - (2,2,2 - trichloro)-ethyl carbonate was virtually ineffective as a sedative agent when subjected to the same test conditions as the compound of the present invention and another close structural analog, bis(1,1,1-trichloro)-2-propyl carbonate was less active. These compounds were prepared by the procedure described herein.

The compound of this invention may be prepared from known materials as exemplified below by the following series of reactions

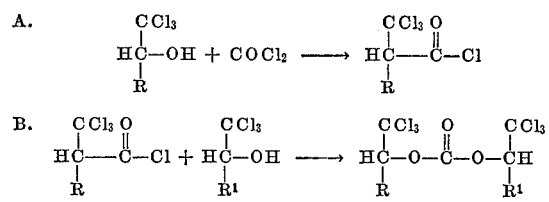

wherein R and R¹ are hydrogen or methyl but are not the same.

In Step A trichloropropanol or trichloroethanol is reacted with phosgene in the presence of an acid acceptor, such as diazabicyclo[2,2,2]octane, triethylamine, diphenylamine, aminopyrine, pyridine, N-methylpiperidine or finely ground anhydrous sodium or potassium carbonate and the like and in the presence of a nonreactive solvent, such as ethyl ether, isopropyl ether, 1,2-dimethoxyethane, ethylene glycol, dimethyl ether, benzene, toluene, petroleum ether, dimethyl formamide and the like to produce a trichloroalkyl chloroformate (I), i.e. 1,1,1-trichloro-2-propyl chloroformate or 2,2,2-trichloroethyl chloroformate. The preferred acid acceptor is diazabicyclo-[2,2,2]-octane and the preferred solvent is ethyl ether. The reaction is carried out at a temperature of from about 20° C. to about 120° C. Preferably the reaction is carried out initially at room temperature and if necessary the temperature is elevated to 30° to 120° C. to complete the reaction. If desired the trichloroalkyl chloroformate can be isolated by distillation in vacuo after first removing the acid addition salt.

The trichloroalkyl chloroformate is then (Step B) esterified with either trichloroethanol or 1,1,1-trichloro-2-propanol, depending upon whether 1,1,1-trichloro-2-propyl chloroformate or 2,2,2-trichloroethyl chloroformate was prepared in Step A, in the presence of an acid acceptor and a non-reactive solvent to produce the compound of this invention 1,1,1-trichloro-2-propyl 2,2,2-trichloroethyl carbonate (II). The acid acceptors and solvents which may be utilized in this step are the same as those described in Step A and temperature at which the reaction is carried out is as described for Step A. Preferably pyridine is utilized as both the acid acceptor and solvent. After the reaction is completed the compound of this invention is conveniently recovered by cooling the reaction mixture extracting the mixed ester (II) with a suitable solvent, e.g. ethyl acetate followed by distillation in vacuo.

The compound of this invention possesses sedative activity making it useful as a sedative in mammals.

The sedative activity of 1,1,1,-trichloro-2-propyl 2,2,2-trichloroethyl carbonate was evaluated by the behavioral depression test. In the behavioral depression test, treated mice are observed in an undisturbed condition for signs of behavioral depression and are checked for their reaction to selected auditory, nociceptive and tactile stimuli. At the same time, a subjective evaluation of spontaneous motor activity is made. When 1,1,1-trichloro-2-propyl 2,2,2-trichloroethyl carbonate was tested the oral minimal effective dose (MED) in the mouse was 300 mg./kg. In contrast when bis-(2,2,2-trichloro)-ethyl carbonate was tested no significant sedative activity was observed at doses as high as 600 mg./kg. p.o. and when bis-(1,1,1-trichloro)-2-propyl carbonate was tested the minimal effective dose was found to be 600 mg./kg.

Table I below contains the minimal effective dose (MED) of 1,1,1-trichloro - 2 - propyl 2,2,2-trichloroethyl carbonate in various species of mammals.

Table I

| | Oral minimal effective dose (mg./kg.) |
|---|---|
| Mouse | 300 |
| Rat | 50 |
| Squirrel Monkey | 200 |
| Cat | [1] 100 |
| Dog | 100–300 |

[1] 50 i.v.

The compound did not produce emesis in any of the species in which it was tested.

Table II below contains additional pharmacological data relating to 1,1,1-trichloro - 2 - propyl 2,2,2-trichloroethyl carbonate.

Table II

| Test: | Mg./kg. |
|---|---|
| $LD_{50}$, mouse | 1700 |
| $HD_{50}$, mouse | 600 |
| ($HD_{50}$ is that dose which causes loss of the righting reflex for at least 15 seconds in 50% of the animals treated.) | |
| Mouse Therapeutic Index $LD_{50}/HD_{50}$ | 2.8 |
| $LD_{50}$, rat | 1130 |
| $HD_{50}$, rat | 238 |
| Rat Therapeutic Index $LD_{50}/HD_{50}$ | 4.7 |

The compound of this invention may be compounded and formulated into pharmaceutical preparations in unit dosage form for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium, stearate, vegetable oil such as peanut oil, etc., liquid petroleum, glycerin, sorbitol, ethanol, agar, elixirs, syrups and water including sterile water. The composition may take the form of tablets, powders, granules, capsules, suspension, solutions, and the like.

The compound of this invention when administered orally or parenterally in a sedative amount is effective in producing sedation in mammals. An oral dosage range of from about 0.5 to about 2 grams is effective for producing sedation in mammals, which may be administered in divided dosage, e.g., two, three or four times a day. The compound of this invention is administered in substantially the same dosage as chloral hydrate. Administration of the compound is conveniently begun at the minimal effective dose (MED) or $ED_{50}$ of the particular compound in the particular species of mammal. However, in general, the particular dosage most suitable for a particular application, as might be expected, will vary with the age, weight and general health of the mammal under treatment and the degree of sedation required. After taking into consideration these factors and any other factors to be considered, one skilled in the art of treating diseases of mammals can readily determine the appropriate dosage.

The following examples are intended to illustrate the invention described herein without unduly restricting it.

EXAMPLE 1
Preparation of 1,1,1-trichloro-2-propyl chloroformate

A solution of 1,1,1-trichloro-2-propanol (16.5 g., 0.1 mol.) and 1,4-diazabicyclo[2,2,2]octane (5.6 g., 0.05 mol.) in anhydrous $Et_2O$ (50 ml.) was added dropwise at room temperature to a vigorously stirred solution of phosgene (20 g., 0.2 mol.) in anhydrous ethyl ether (200 ml.). The mixture was stirred at room temperature for 17 hours, filtered through Celite, and the filtrate evaporated to dryness in vacuo. The residue (18 g.) was Kugelrohr-distilled, and the product 1,1,1-trichloro - 2 - propyl chloroformate was collected at 43–50° C. (0.055 mm.), $n_D^{20}$ 1.4715. A small amount of bis-(1,1,1 - trichloro-2-propyl)carbonate was left in the pot as a white solid.

A pure sample was obtained by vacuum-distillation as a colorless liquid, B.P. 66–67° C. (6 mm.), $n_D^{20}$ 1.4700; infrared (neat), 3.35 (w.), 5.61, 6.89, 7.2, 7.5, 8.65, 8.83, 9.51, 10.5, 11.63, 12.44, 12.8, 14.74µ.

EXAMPLE 2
Preparation of 1,1,1-trichloro-2-propyl-2,2,2-trichloroethyl carbonate (Procedure A)

2,2,2-trichloroethyl chloroformate (Aldrich Chemical Company; 6.8 g., 32 mmol.) was added dropwise to a stirred solution of 1,1,1-trichloro-2-propanol (5 g., 30.6 mmol.) in dried pyridine (10 ml.). After stirring at room temperature for 18 hours, the reaction mixture was poured into iced water, acidified with hydrochloric acid, and extracted with ethyl acetate. The extract was washed with water, dried ($MgSO_4$), and evaporated in vacuo, giving the product as a pale liquid (9.6 g., 92.5% yield), which was purified by Kugelrohr-distillation. The pure product was collected at 80–86° C. (0.006 mm.), solidified upon cooling, M.P. 36–39° C.; infrared (in chloroform) 3.0, 3.37, 5.66, 6.9, 7.23, 7.46, ca. 8, 8.78, 9.01, 9.3, 9.58, 10.29, 10.6, 11.3, 12.14µ; infrared (Nujol mull) 5.67, 7.25, 7.48, ca. 8, 8.78, 9.01, 9.4, 9.58, 10.3, 10.64, 11.29, ca. 12.15, 12.7, 13.67, 14.33µ.

*Analysis.*—Calculated for $C_6H_6Cl_6O_3$ (338.86) (percent): C, 21.27; H, 1.78; Cl, 62.78. Found (percent): C, 20.99; H, 1.64; Cl, 62.50.

EXAMPLE 3
Preparation of 1,1,1-trichloro-2-propyl 2,2,2-trichloroethyl carbonate (Procedure B)

1,1,1-trichloro-2-propyl chloroformate (6.0 g., 26.5 mmol.) was added to a stirred solution of 2,2,2-trichloroethanol (3.7 g., 25 mmol.) in dried pyridine (10 ml.). After stirring at room temperature for 4 hours the reaction mixture was poured into iced water, acidified with hydrochloric acid, and extracted with ethyl acetate. The extract was washed with water, dried ($MgSO_4$) and evaporated in vacuo, giving a pale liquid (7.1 g.). The product 1,1,1-trichloro-2-propyl 2,2,2-trichloroethyl carbonate was purified by Kugelrohr-distillation as a white, crystalline solid, collected at 85–90° C. (0.007 mm.). The infrared spectrum was superimposable with that prepared by Procedure A.

While this invention has been described and exemplified in terms of its preferred embodiment, those skilled in the art will appreciate that modifications can be made without departing from the spirit and scope of the invention.

We claim:
1. 1,1,1-trichloro-2-propyl 2,2,2-trichloroethyl carbonate.

References Cited
UNITED STATES PATENTS 3,193,573  7/1965  Caldwell _____ 260—463

LEWIS GOTTS, Primary Examiner

D. G. RIVERS, Assistant Examiner

U.S. Cl. X.R.

424—301